United States Patent
Shen et al.

(10) Patent No.: US 7,857,059 B2
(45) Date of Patent: Dec. 28, 2010

(54) APPARATUS FOR MITIGATING SLUGGING IN FLOWLINE SYSTEMS

(75) Inventors: Joseph J. S. Shen, Katy, TX (US); Hoi Yeung, Bedfordshire (GB)

(73) Assignee: Chevron U.S.A. Inc., San Ramon, CA (US)

(*) Notice: Subject to any disclaimer, the term of this patent is extended or adjusted under 35 U.S.C. 154(b) by 0 days.

(21) Appl. No.: 11/741,523

(22) Filed: Apr. 27, 2007

(65) Prior Publication Data

US 2008/0264645 A1    Oct. 30, 2008

(51) Int. Cl.
*E21B 43/01* (2006.01)
(52) U.S. Cl. .................. 166/367; 166/344; 166/345; 166/346; 166/347; 285/181; 138/120; 138/155; 138/DIG. 8
(58) Field of Classification Search .............. 166/367, 166/344–347, 366; 405/224.2–224.4; 138/120, 138/DIG. 8, 155; 285/181, 182, 147.1
See application file for complete search history.

(56) References Cited

U.S. PATENT DOCUMENTS

| | | | | |
|---|---|---|---|---|
| 4,009,734 | A * | 3/1977 | Sullivan | 138/125 |
| 4,627,646 | A | 12/1986 | Kessel | |
| 5,111,849 | A * | 5/1992 | Zeh | 138/118 |
| 5,553,976 | A * | 9/1996 | Korsgaard | 405/195.1 |
| 5,906,226 | A * | 5/1999 | Goodman | 138/109 |
| 6,209,800 | B1 * | 4/2001 | Thomas | 239/195 |
| 2004/0163817 | A1 * | 8/2004 | Horton, III | 166/367 |
| 2007/0028984 | A1 * | 2/2007 | Caro et al. | 138/177 |
| 2008/0017550 | A1 * | 1/2008 | Caro et al. | 208/132 |
| 2008/0053659 | A1 * | 3/2008 | Kinnari et al. | 166/367 |

FOREIGN PATENT DOCUMENTS

| WO | WO 2004/015237 | 2/2004 |
|---|---|---|
| WO | WO 2004/083706 | 9/2004 |

(Continued)

OTHER PUBLICATIONS

Kjetil Havre, ABB Corporate Research, and Morten Dalsmo; Active Feedback Control As The Solution To Severe Slugging; SPE 71540; 2001.

(Continued)

*Primary Examiner*—Thomas A Beach
*Assistant Examiner*—Matthew R Buck
(74) *Attorney, Agent, or Firm*—Frank C. Turner; Nicholas F. Gallo; Christopher Northcutt

(57) ABSTRACT

A system for mitigating slugging in the conveyance of hydrocarbons in a flowline includes a first portion of flowline that extends substantially longitudinally along a declining surface. The first flowline portion carries multiphase hydrocarbons. A second portion of flowline extends upward from adjacent the first portion of flowline, and is in fluid communication with the first portion of flowline. A slug-mitigating region is between the first and second portions of flowline so slug-mitigating assembly receives the hydrocarbons from the first portion of flowline and conveys the hydrocarbons to the second portion of flowline. The slug-mitigating region has consecutively joined tubular segments that are each arcuate along a predetermined arcuate angle, with substantially uniform cross-sections. The first portion of flowline can be a subsea flowline extending along a sea floor, and the second portion of flowline can be a riser.

36 Claims, 6 Drawing Sheets

FOREIGN PATENT DOCUMENTS

| WO | WO 2006/032877 | 3/2006 |
|---|---|---|
| WO | WO 2007/034142 | 3/2007 |

OTHER PUBLICATIONS

K. Kovalev, M.G.W.M. Seelen, G. Haandrikman, Shell Global Solutions International B.V.; Vessel-Less $S^3$: advanced solution to slugging pipelines; SPE 88569; 2004.

K. Kovalev, Shell Global Solutions International B.V.; A. Cruickshank, Dril-Quip (Europe), Ltd., J. Purvis, Shell U.K. Exploration and Production; The Slug Suppression System in Operation; SPE 84947; 2003.

Kjetil Havre, ABB Corporate Research, and Morten Dalsmo; Active Feedback Control as the Solution to Severe Slugging; SPE 71540, 2001.

PCT, International Search Report, Oct. 6, 2008, 1-14.

A.G. Adedigba, et al.; "The Use of a Novel Pipe Device to Reduce Severe Slugging in Pipeline-Riser Systems"; BHR Group 2006 Multiphase Technology 5; pp. 289-296.

* cited by examiner

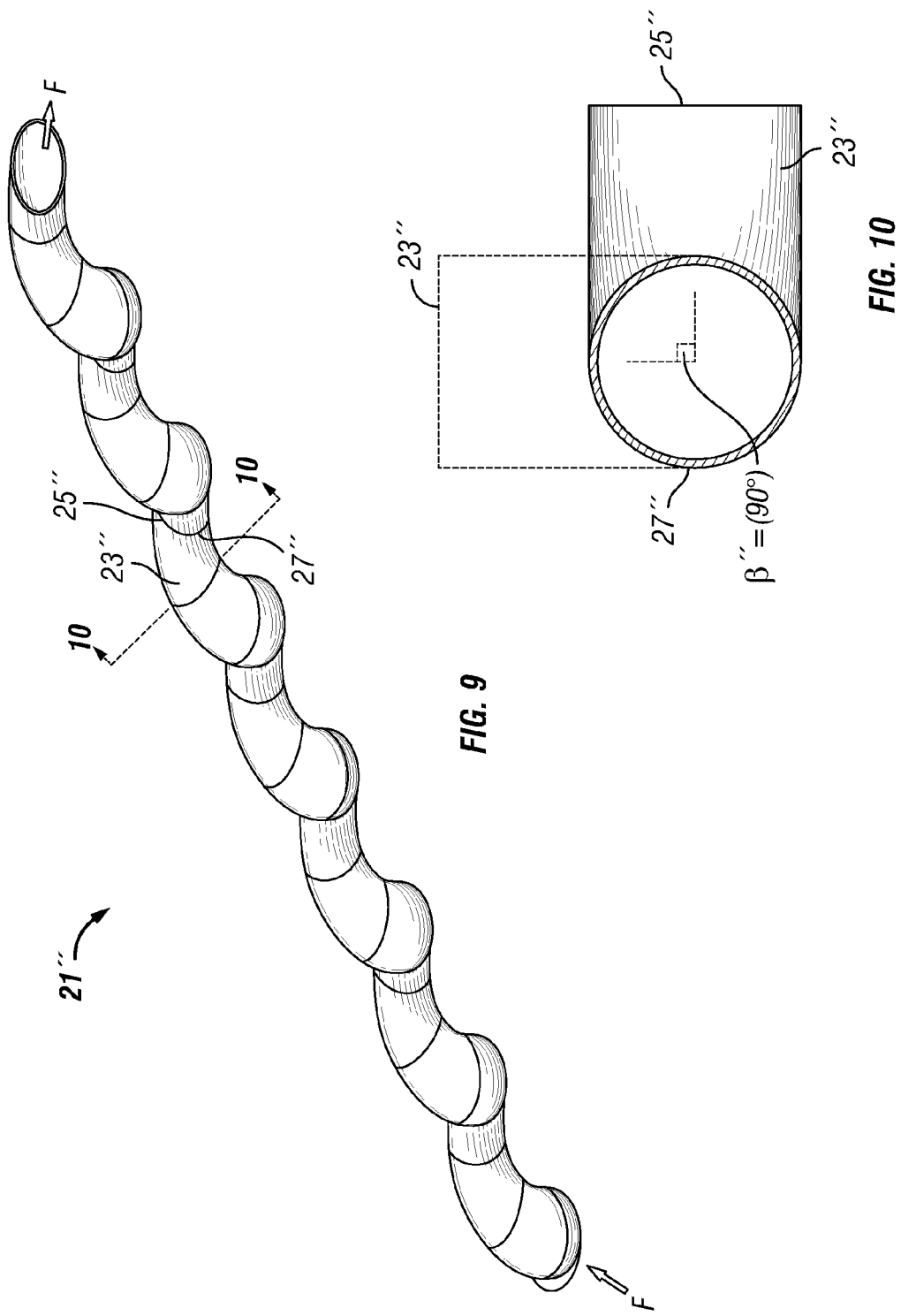

APPARATUS FOR MITIGATING SLUGGING IN FLOWLINE SYSTEMS

FIELD OF THE INVENTION

This invention relates in general to the conveyance of hydrocarbons, and in particular to an apparatus system and methods associated therewith, for mitigating severe slugging when conveying multiphase hydrocarbons.

BACKGROUND OF THE INVENTION

Slugging, and severe slugging, is a problem that is especially related to mature oil fields. As an oil well ages, gases and liquids in the multiphase hydrocarbons tend to separate in the flowlines and risers as the flowlines travel down an decline to a subsequent incline. Typically, this is due to the heavier liquids moving faster than corresponding gases, which results in the formation of liquid and gas pockets (i.e. slugs). The formation of slugs can result in large pressure and production fluctuations. Such pressure and production fluctuations can give rise to operational hazards and can damage equipment.

Present slug-mitigating measures include slowing down the rate of oil production or extraction, which can easily reduce oil production from normal levels by ten percent (10%). Reducing oil production to mitigate severe slugging not desirable.

Present slug-mitigating systems include certain mechanical means on the top-side, such as controllable chokes or valves with appropriate control algorithms. These techniques can be generally classified as "active" mitigation/control, as they regulate the amount of multiphase fluids flowing through the pipelines and risers in response to measured or sensed operating conditions (e.g., pressure, or flow rate).

Another class of slug-mitigating assemblies or systems is "passive" mitigation, in which the flow of multiphase hydrocarbons is not actively controlled with the system. The mitigation effect can be accomplished through a change in geometry of the piping system or flowline. For example, it is believed that the technology in U.S. patent application Ser. No. US2007/0028984, having a filing date of Feb. 8, 2007 and Colin G. Caro et al. as the named inventors, can mitigate slugging. The Colin et al. application discloses a spiral technology or small amplitude helical technology (SMAHT) that is produced by twisting a first pipe against a second pipe—similar to plaiting of ropes. In several examples, the first pipe has a larger diameter than the second pipe. SMAHT has an amplitude to pipe diameter ratio of less than or equal to 0.5, Moreover, the formation of SMAHT inherently deforms the cross-section of the first pipe, and possibly the second pipe, as the first pipe is bent and twisted around the second pipe.

Such slugging problems can also arise on land when piping multiphase hydrocarbons. Such slugging can occur at the intersection of a downwardly inclined portion of pipeline with an upwardly inclined portion of pipeline, such as through terrain having hills or mountains, which is known in the art as "terrain induced slugging."

SUMMARY OF THE INVENTION

The invention comprises a system, apparatus and method for mitigating slugging in the conveyance of hydrocarbons in a flowline. Moreover, the invention comprises a system, apparatus and method for mitigating slugging in the conveyance of hydrocarbons in a flowline from the sea floor to the surface of the sea. The invention is a passive mitigating system, apparatus, and method that can be used alone or in conjunction with an active mitigating system.

A system for mitigating slugging in the conveyance of hydrocarbons in a flowline from the sea floor to the surface of the sea includes a subsea flowline that extends substantially longitudinally along a surface of the sea floor. The subsea flowline carries multiphase hydrocarbons therein. A riser extends from the surface of the sea, and is in fluid communication with the flowline. A slug-mitigating assembly is positioned between the subsea flowline and the riser so that the slug-mitigating assembly receives the hydrocarbons from the flowline and conveys the hydrocarbons to the riser. The slug-mitigating assembly has joined tubular segments that are each arcuate along a predetermined arcuate angle. Each segment has a substantially uniform cross-section.

In the system, each of the tubular segments can be positioned such that the hydrocarbons exiting the segment are longitudinally closer to the riser than the hydrocarbons entering the segment. In the system, each tubular segment positioned between the tubular segments connected to the flowline and the riser, respectively, can be oriented at a predetermined angle of rotation relative to adjacent tubular segments. The angle of rotation can be such that the flowpath of the hydrocarbons is in a spiral through the slug-mitigation assembly. The angle of rotation can also be such that the flowpath of the hydrocarbons undulates through the slug-mitigation assembly.

In the system, the actuate angle can be is about 45 degrees, and the arcuate angle can be about 90 degrees. In the system, the substantially uniform cross-section can be substantially circular. In the system, the slug-mitigating assembly can extend substantially longitudinally along the sea floor prior to connection with the riser.

In the system, the slug-mitigating assembly can also include an assembly centerline from which the tubular segments deviate in differing directions along the length of the slug-mitigating assembly, and an amplitude that is defined as the maximum distance from the assembly centerline to a centerline of the flowpath. The amplitude divided by the diameter of the substantially uniform cross-section can define a slug-mitigating assembly ratio that is greater than 0.5. The tubular segments can deviate from the assembly centerline in substantially opposite directions. The tubular segments can deviate from the assembly centerline substantially equally in the differing directions. The tubular segments can further deviate from the assembly centerline substantially equally in all directions surrounding the assembly centerline.

An assembly for mitigating slugging of multiphase hydrocarbons, which is adapted to be positioned between a subsea flowline extending substantially longitudinally along a sea floor and a riser extending from a surface of the sea toward the sea floor, includes consecutively joined tubular segments. Each segment is arcuate along a predetermined arcuate angle. Each segment has a substantially uniform cross-section.

In the assembly, each segment each tubular segment positioned between the tubular segments that are to be connected to the flowline and the riser, respectively, can be oriented at a predetermined angle of rotation relative to adjacent tubular segments. The angle of rotation can be between 0 degrees and 180 degrees, thereby causing the flowpath of the hydrocarbons to be in a spiral through the slug-mitigation assembly. The angle of rotation can also be 180 degrees, thereby causing the flowpath of the hydrocarbons to undulate sinusoidally through the slug-mitigation assembly.

In the assembly, the arcuate angle can be selected from a group consisting of about 45 degrees and about 90 degrees. In the assembly, the substantially uniform cross-section can be substantially circular.

In the assembly, the slug-mitigating assembly can also include an assembly centerline, from which the tubular segments deviate in differing directions along the length of the slug-mitigating assembly, and an amplitude that is defined as the maximum distance from the assembly centerline to a centerline of the flowpath. The amplitude divided by the diameter of the substantially uniform cross-section can define a slug-mitigating assembly ratio that is greater than 0.5. The tubular segments can deviate from the assembly centerline in substantially opposite directions. The tubular segments can deviate from the assembly centerline substantially equally in the differing directions. The tubular segments can further deviate from the assembly centerline substantially equally in all directions surrounding the assembly centerline.

A method for mitigating slugging in the conveyance of hydrocarbons from the sea floor to the surface of the sea includes the step of conveying multiphase hydrocarbons from a flowline to a riser through a slug-mitigating region. The method also includes the step of maintaining a volume of the slug-mitigation region for the conveyance of the multiphase hydrocarbons with a substantially uniform cross-section within the slug-mitigating region through which the hydrocarbons flow. The method also includes the step of altering a flowpath of the hydrocarbons along a plurality of arcs formed in the slug-mitigating region.

In the conveying step, the slug-mitigating region can include a plurality of tubular segments. The step further includes the step of orienting each of the plurality of tubular segments at a predetermined angle of rotation relative to the immediately prior tubular segment thereby causing the flowpath of the hydrocarbons to be in a spiral though the slug-mitigation assembly. In which case, the method can also include the step of inducing the hydrocarbons to swirl when passing through the slug-mitigation assembly in response to the spiral shape.

In the conveying step, the slug-mitigating region can include a plurality of tubular segments. The step further includes the step of orienting each of the plurality of tubular segments at a predetermined angle of rotation, relative to the immediately prior tubular segment thereby causing the flowpath of the hydrocarbons to undulate, in which case, the angle of rotation is about 180 degrees.

A system for mitigating slugging in the conveyance of hydrocarbons in a flowline includes a first portion of flowline that extends substantially longitudinally along a declining surface. The first portion of flowline carries multiphase hydrocarbons therein. A second portion of flowline extends upward from adjacent the first portion of flowline. The second portion of flowline is in fluid communication with the first portion of flowline. A slug-mitigating region is positioned between the first and second portions of flowline so that the slug-mitigating region receives the hydrocarbons from the first portion of flowline and conveys the hydrocarbons to the second portion of flowline. The slug-mitigating region has consecutively joined tubular segments that are each arcuate along a predetermined arcuate angle. Each segment has a substantially uniform cross-section.

In the system, each tubular segment can be positioned such that the hydrocarbons exiting the tubular segment are longitudinally closer to the second portion of flowline than the hydrocarbons entering the tubular segment. In the system, each tubular segment positioned between the tubular segments connected to the first and second portions of flowline, respectively, can be oriented at a predetermined angle of rotation relative to adjacent tubular segments. The angle of rotation can be such that the flowpath of the hydrocarbons is in a spiral through the slug-mitigation region. The angle of rotation can be such that the flowpath of the hydrocarbons undulates through the slug-mitigation; region. In the system, the arcuate angle can be about 45 degrees:, and can be about 90 degrees. In the system, the substantially uniform cross-section can be substantially circular. In the system, the slug-mitigating region can extend substantially longitudinally with the declining surface prior to connection with the second portion of flowline.

In the system, the slug-mitigating region can include a region centerline, from which the tubular segments deviate in differing directions along the length of the slug-mitigating region, and an amplitude that is defined as the maximum distance from the region centerline to a centerline of the flowpath. The amplitude divided by the diameter of the substantially uniform cross-section can define a slug-mitigating region ratio that is greater than 0.5. The tubular segments can deviate from the region centerline in substantially opposite directions. The tubular segments can deviate from the region centerline substantially equally in the differing directions. The tubular segments can further deviate from the region centerline substantially equally in all directions surrounding the region centerline.

BRIEF DESCRIPTION OF THE DRAWINGS

FIG. 9 is a schematic view of another embodiment of the slug-mitigating assembly of FIG. 1.

FIG. 10 is a sectional view of the slug-mitigating assembly of FIG. 8, when viewed along line 10-10.

DETAILED DESCRIPTION OF THE PREFERRED EMBODIMENT

Figure 1:
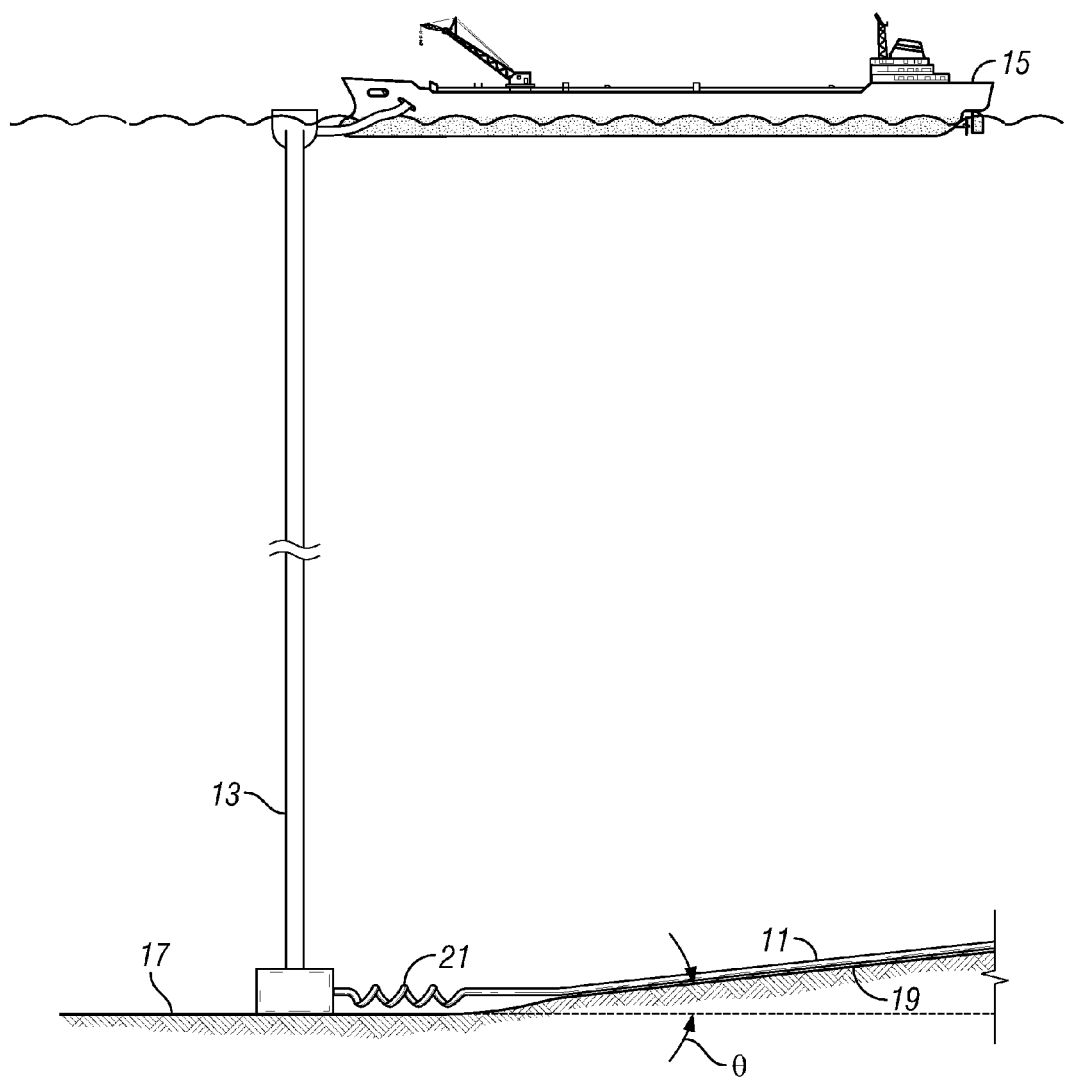
FIG. 1 is a schematic view of a subsea flowline, riser, and slug-mitigating Assembly constructed in accordance with an embodiment of this invention.

Referring to FIG. 1, a system is illustrated for transporting multiphase hydrocarbons from a first portion of flowline positioned on a declining slope to a second portion of flowline extending generally upward relative to the first portion of flowline. In the preferred embodiment, the first portion of flowline is a subsea flowline 11 and the second portion of flowline is a riser assembly or riser 13. Riser 13 conveys the hydrocarbons from subsea flowline 11 to a vessel 15 at the surface of the sea to initial treatment, processing, and/or storage. While vessel 15 is illustrated as a floating production, storage and offloading (FPSO) vessel, those readily skilled in the art will understand that, for this system, vessel 15 can also be a platform (e.g. a tension leg platform (TLP), a semi-submersible, and a spar) or a transport vessel.

Sea floor 17 supports flowline 11. Because seafloor 17 can have undulations over long distances, there are situations in which flowline 11 will extend across a declining portion 19 of sea floor 17 prior to reaching riser 13. Declining portion 19 is caused by an angle of inclination θ relative to sea floor 17 adjacent riser 13. Even with a slight angle of inclination θ, for example two degrees, slugging of the hydrocarbons can occur because the heavier liquids and solids will move faster than the lighter gases down declining portion 19, which will in turn cause pockets of liquids and gases to form before or just after entering riser 13.

A slug-mitigating region of the flowline or a slug-mitigating assembly 21 is positioned between the first portion of flowline or flowline 11, and the second portion of flowline or riser 13. Slug-mitigating assembly 21 induces a mixing and flow redistribution of the heavier liquids and solids, and the lighter gas phases.

Referring to FIGS. 2-5, in the preferred embodiment, slug-mitigating assembly 21 is formed with a plurality of elbow joints or tubular segments 23. Each tubular segment 23 has cross-section with an inner diameter D. Each tubular segment 23 is also formed in an arcuate shape defined by an arcuate angle α and a radius R extending to a centerline of the segment 23. Each segment 23 also has a first end 25 and a second end 27. In the preferred embodiment, the cross-section of each tubular segment 23 is substantially uniform so that D does not vary; except for within normal machining tolerances, along the length of segment 23. As will also be readily appreciated by those skilled in the art, tubular segment 23 can have numerous cross-sections depending upon design criteria (e.g., octagonal, elliptical or circular).

Figure 2:
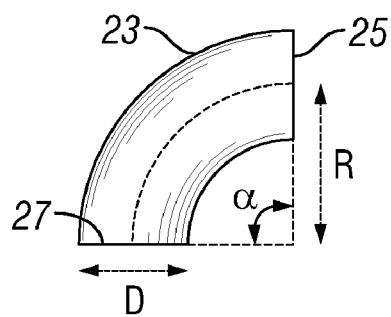
FIG. 2 is schematic view of a segment of the slug-mitigating assembly of FIG. 1.
Figure 3:
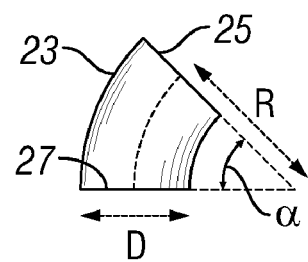
FIG. 3 is a schematic view of a segment of the slug-mitigating assembly of FIG. 1.

In the most preferred embodiment, the cross-section of each tubular segment 23 is uniform and is substantially circular. "Substantially", as used when referencing the uniform cross-section, is merely recognition that no cross-section can be perfectly uniform especially as a circular, as well as recognition of minor variances in dimensions due to fabricating segments within certain predetermined machining or manufacturing tolerances. "Substantially", as used herein when referencing the uniform cross-section does not include, for example, a circular cross-section that is deformed due to bending such that the cross-section at the bend is compressed along the inner surface of the bend and stretched along the outer surface such that an elliptical or non-circular cross-section is formed. A typical sign of such bending is that the cross-section narrows between the inner and outer surfaces such that the diameter narrows within such a bend. As seen in FIGS. 2 and 3, diameter D of the cross-section is substantially uniform from end 25 to end 27.

Figure 4:
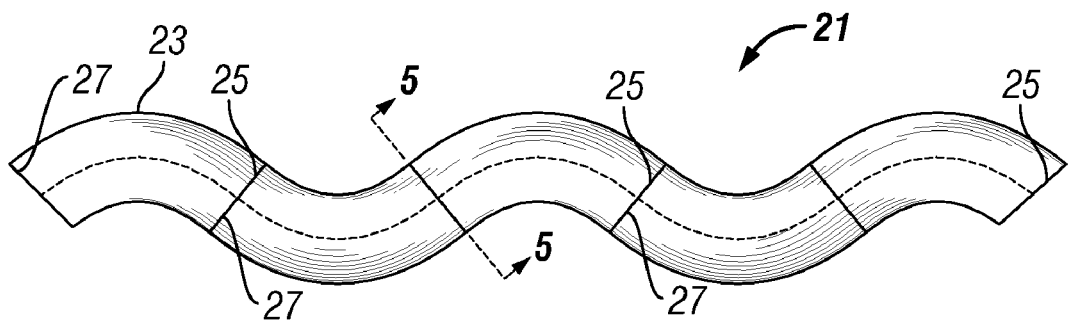
FIG. 4 is a schematic view of the slug-mitigating assembly when the segments of FIG. 2 are connected end-to-end.
Figure 5:
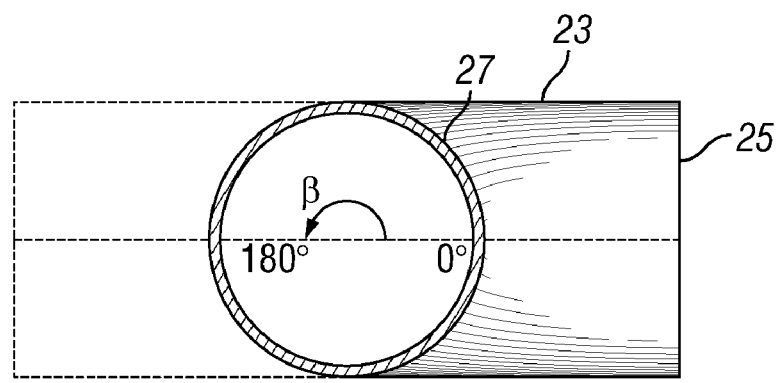
FIG. 5 is a sectional view of the slug-mitigating assembly of FIG. 4, when viewed along line 5-5.
Figure 6:
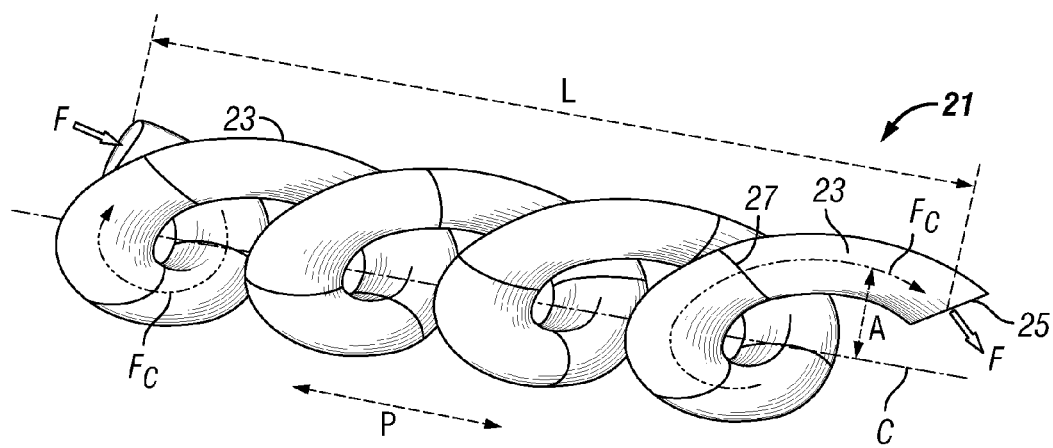
FIG. 6 is a schematic view of another embodiment of the slug-mitigating assembly when the segments of FIG. 2 are connected end-to-end.

Segment 23 in FIG. 2 has an arcuate angle α of about ninety degrees (90°), and segment 23 in FIG. 3 has an arcuate angle α of about forty-five degrees (45°). As will be readily appreciated by those skilled in the art, a plurality of segments 23 (four 90-degree segments 23 of FIG. 2 or eight 45-degree segments 23 of FIG. 3) will form a donut-like structure if they are connected end 25 to end 27 without rotating at least one of segments 23 offline. However, as shown in FIGS. 4 and 5, other shapes are formed when segments 23 are rotated relative to each other at the connection of first and second ends 25,27 of adjacent segments 23 by an angle of rotation β. For ease of reference, when segments 23 are oriented inline such that a donut-like structure would be formed, such angle of rotation β is about zero degrees (0°). In FIGS. 4 and 5, angle of rotation β is about one-hundred and eighty degrees (180°);

Referring to FIG. 6, each slug-mitigating assembly 21 has a centerline C extending centrally therethrough. Preferably, centerline C extends substantially parallel or at a slight angle with the axis of flowline 11. Slug-mitigation assembly 21 has an overall length L, which is the axial length of slug-mitigating assembly 21, rather than the length of displacement the hydrocarbons travel while being conveyed through the plurality of tubular segments 23 that are connected end-to-end 27,25. Such a displacement would be measurable along the center of a flowpath F, or a flowpath centerline $F_c$, extending centrally through tubular segments 23 of slug-mitigating assembly 21.

In the preferred embodiment, slug-mitigating assembly 21 has an amplitude A, which is the maximum distance from centerline C to flowpath centerline $F_c$. As will be readily appreciated by those skilled in the art, in an embodiment such as that shown in FIG. 6, amplitude A is the same in every direction from centerline C because slug-mitigating assembly 21 spirals around centerline C. However, in an embodiment such as that shown in FIG. 4, amplitude A is only measured in two directions because slug-mitigating assembly 21 undulates sinusoidally along centerline C. In either embodiment, it is preferable for the ratio of the amplitude to the inner diameter (A/D) to be greater than 0.5. Such a ratio ensures that flowpath F of the hydrocarbons is altered away from, or deviates from centerline C.

Slug-mitigating assembly 21 also has a pitch P, which is the axial distance between two adjacent peaks. As noted previously, if angle of rotation β is equal to zero degrees (0°), a donut-like structure is formed. When angle of rotation is β is equal to one-hundred eighty degrees (180°), an undulating, sinusoidal structure is formed. However, when angle of rotation β is between zero and one-hundred and eighty degrees (0°<β<180°), a spiral-shaped structure is formed. As will he readily appreciated by those skilled in the art, pitch P is directly proportional to angle of rotation β. As angle of rotation β increases, the spiral becomes looser with a large pitch P value and approaches that of the undulating, sinusoidal structure. However, as angle of rotation β decreases, the spiral becomes more tightly bound with a small pitch P value and approaches that of the donut-like structure.

Referring to FIGS. 7-12, various embodiments of slug-mitigating assembly 21 are illustrated as 21', 21'', and 21'''. As will be discussed in more detail herein, each of these variations of slug-mitigating assembly 21 is created by changing either the arcuate angle α, the angle of rotation β, or a combination thereof. For example another standard "standard" or conventional elbow component that is readily available is a thirty degree (30°) elbow or tubular section.

Figure 7:
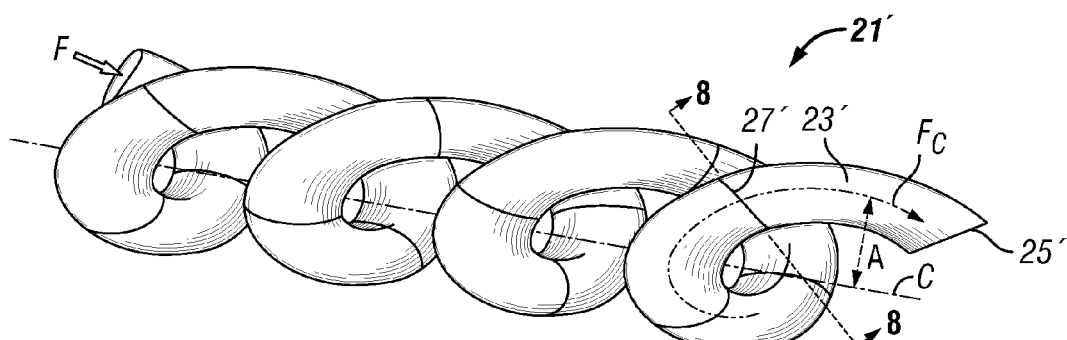
FIG. 7 is a schematic view of an embodiment of the slug-mitigating assembly of FIG. 1.
Figure 8:
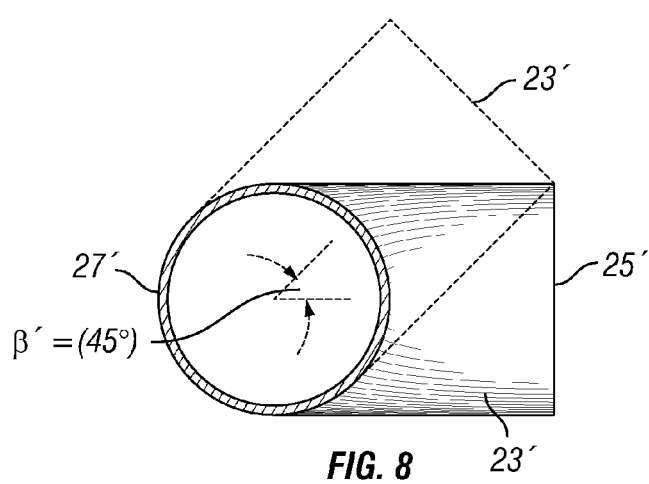
FIG. 8 is a sectional view of the slug-mitigating assembly of FIG. 8, when viewed along line 8-8.

Referring to FIGS. 7-8, slug-mitigating assembly 21' has a spiral shape for flowpath F of the hydrocarbons to take while being conveyed therethrough. The spiral shape of flowpath F in this embodiment helps to induce a swirling of the multiphase hydrocarbons traveling within slug-mitigating assembly 21'. Such swirling helps to mix the gas and liquids traveling through flowpath F to mitigate against formation of pockets of gas and liquid, as well as to counteract pockets that had already formed before entering slug-mitigating assembly 21'. The spiral shape of flowpath F also undulates above and below centerline C, which also helps to mitigate formation of gas and liquid pockets, and counteract previously-formed gas and liquid pockets.

As illustrated, slug-mitigating assembly 21' is constructed with fifteen tubular segments 23' connected end-to-end 27', 25'. Arcuate angle α' for each of tubular segments 23' in slug-mitigating assembly 21' is ninety degrees (90°), and angle of rotation β' of each segment 23' is forty-five degrees (45°). As is best seen in FIG. 8; the shadow portion represents that the next tubular segment 23 is rotated forty-five degrees (45°) from the zero degree (0°) angle that would create the donut-like structure at the connection with second end 27' of segment 23'.

Referring to FIGS. 9-10; slug-mitigating assembly 21" has another spiral shape for flowpath F. As compared to the embodiment shown in FIGS. 7-8, slug-mitigating assembly 21" has a larger pitch P, and a smaller amplitude A. For segments 23" having the same diameter as segments 23' (FIGS. 7-8), the A/D ratio in FIGS. 19-10 is less than the embodiment shown in FIGS. 7-8; therefore, the spiral shape of flowpath F is looser in the embodiment shown in FIGS. 9-10.

As illustrated, slug-mitigating assembly 21" is constructed with twenty-six segments 23" connected end-to-end 27",25". Arcuate angle α" for each of tubular segments 23" in slug-mitigating assembly 21' is for forty-five degrees (45°), and angle of rotation β of each segment 23" is ninety degrees (90°). As is best seen in FIG. 10, the shadow portion represents that the next tubular segment 23" is rotated ninety degrees (90°) from the zero degree (0°) angle. Like the embodiment shown in FIGS. 7-8, slug-mitigating assembly 21" also helps to induce a swirling of the multiphase hydrocarbons traveling within slug-mitigating assembly 21". The spiral shape of flowpath F also undulates above and below centerline C, which also helps to mitigate formation of gas and liquid pockets, and counteract previously-formed gas and liquid pockets.

Figure 11:
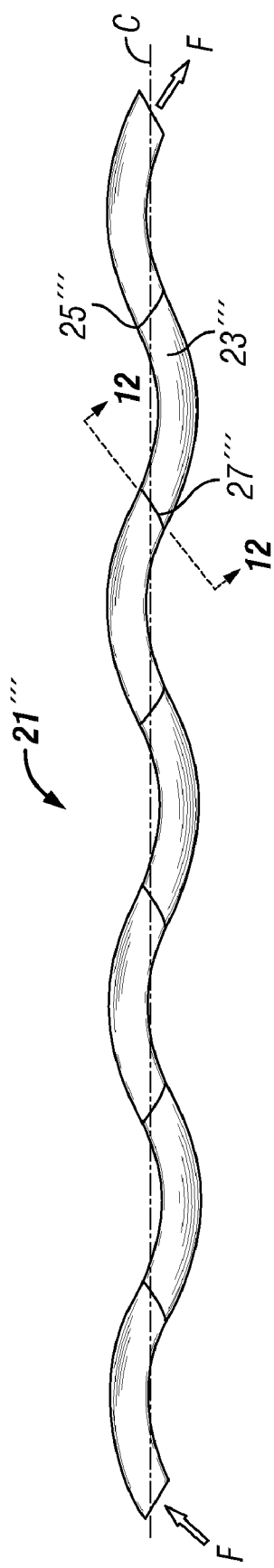
FIG. 11 is a schematic view of another embodiment of the slug-mitigating assembly of FIG. 1.
Figure 12:
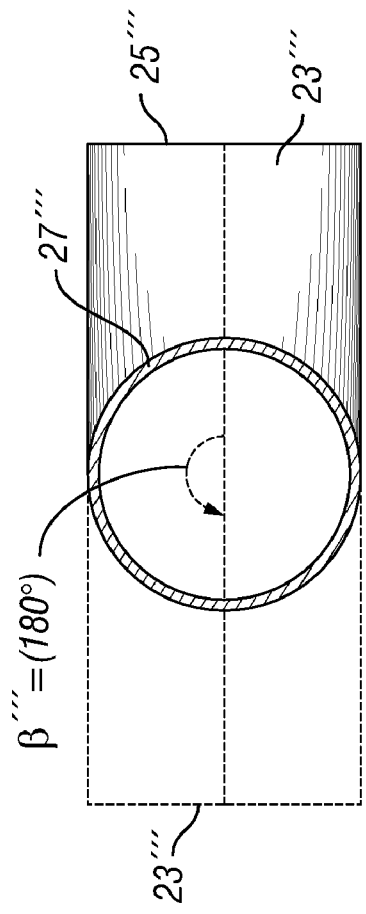
FIG. 12 is a sectional view of the slug-mitigating assembly of FIG. 8, when viewed along line 12-12.

Referring to FIGS. 11-12, slug-mitigating assembly 21'" has an undulating, sinusoidal shape for flowpath F. Because it sinusoidal, the pitch P is larger and the amplitude A is smaller than in the previous embodiments of FIGS 7-10. As illustrated, slug-mitigating assembly 21'" is constructed with seven segments 23'" connected end-to-end 27'",25'". Arcuate angle α'" for each of tubular segments 23'" in slug-mitigating assembly 21'" is one-hundred eighty degrees (180°). As is best seen FIG. 12, the segment 23'" is one-hundred eighty degrees (180°). As is best seen in FIG. 12, the shadow portion represents that the next tubular segment 23'" is rotated one-hundred eighty degrees (180°) from the zero degree (0°) angle. The undulating, sinusoidal shape of flowpath F undulates above and below centerline C, which helps to mitigate formation of gas and liquid pockets, and counteract previously-formed gas and liquid pockets.

Figure 13:
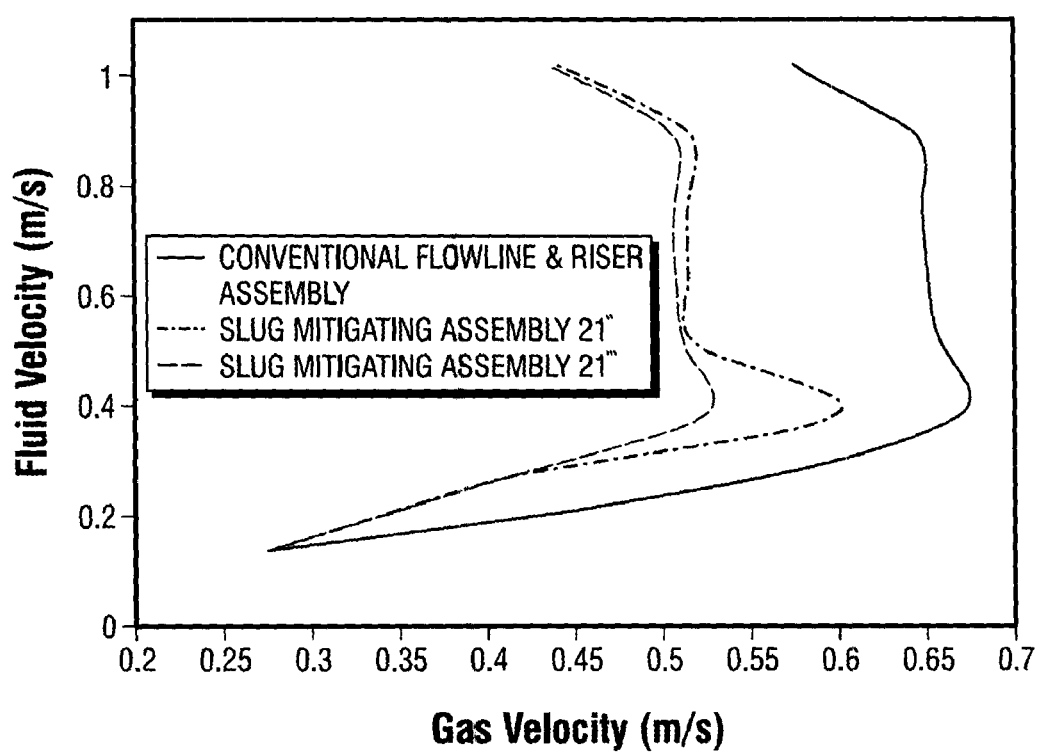
FIG. 13 shows a slugging risk boundary map as further described herein.

For a typical connection between a flowline and riser, severe slugging can be characterized as a function of liquid velocity versus gas velocity for the multiphase hydrocarbons flowing through the flowline and riser. An example of such characterization is shown in FIG. 13.

The solid line represents a conventional flowline and riser assembly without the addition of slug-mitigating assembly 21. Generally speaking, there is less risk of slugging to the right of the solid line, and the risk of severe slugging increases in the zone to the left of the solid line. Therefore, the solid line is representative of a severe slugging risk boundary line. Slug-mitigating assemblies 21 have been shown to essentially shift the severe slugging boundary line to the left; and therefore, reduce the zone of operating conditions at risk of severe slugging.

FIGS. 7-12 are merely examples of how slug-mitigating assemblies 21', 21", and 21'" are constructed. As will be appreciated by those skilled in the art, such embodiments can be constructed using more or less segments 23', 23", 23'" than disclosed. Moreover, segments 23 can be rotated at various angles of rotation β, preferably greater than zero degrees (0°) and less than one-hundred eighty degrees (180°), and have various arcuate angles α, to construct additional embodiments of slug-mitigating assembly 21 within the scope of the present invention.

While the invention has been shown in only some of its forms, it should be apparent to those skilled in the art that it is not so limited, but susceptible to various changes without departing from the scope of the invention. For example, flowline 11 can be a portion of a flowline traveling downhill through a mountainous region, and riser 13 can be another portion of the flowline extending uphill.

What is claimed is:

1. A system for mitigating slugging in the conveyance of hydrocarbons in a flowline from the sea floor to the surface of the sea, comprising:
    a subsea flowline extending substantially longitudinally along a surface of the sea floor, the subsea flowline carrying multiphase hydrocarbons therein;
    a riser extending from the surface of the sea in fluid communication with the flowline; and
    a slug-mitigating assembly positioned between the subsea flowline and the riser so that the slug-mitigating assembly receives the hydrocarbons, front the flowline and conveys the hydrocarbons to the riser, the slug-mitigating assembly having a plurality of consecutively joined tubular segments that are each arcuate along a predetermined arcuate angle, each segment having a substantially uniform cross-section, wherein each tubular segment positioned between the tubular segments connected to the flowline and the riser, respectively, is oriented at a predetermined angle of rotation relative to adjacent tubular segments, the angle of rotation being such that the flowpath of the hydrocarbons is in a spiral through the slug-mitigation assembly.

2. The system according to claim 1, wherein each of the tubular segments being positioned such that the hydrocarbons exiting the segment are longitudinally closer to the riser than the hydrocarbons entering the segment.

3. The system according to claim 1, wherein the arcuate angle is about 45 degrees.

4. The system according to claim 1, wherein the arcuate angle is about 90 degrees.

5. The system according to claim 1, wherein the substantially uniform cross-section is substantially circular.

6. The system according to claim 1, wherein the slug-mitigating assembly further comprises:
    an assembly centerline, from which the tubular segments deviate in differing directions along the length of the slug-mitigating assembly; and
    an amplitude being defined as the maximum distance from the assembly centerline to a centerline of the flowpath.

7. The system according to claim 6, wherein the amplitude divided by the diameter of the substantially uniform cross-section defines a slug-mitigating assembly ratio that is greater than 0.5.

8. The system according to claim 6, wherein the tubular segments deviate from the assembly centerline in substantially opposite directions.

9. The system according to claim 6, wherein the tubular segments deviate from the assembly centerline substantially equally in the differing directions.

10. The system according to claim 9, wherein the tubular segments deviate from the assembly centerline substantially equally in all directions surrounding the assembly centerline.

11. The system according to claim 1, wherein the slug-mitigating assembly extends substantially longitudinally along the sea floor prior to connection with the riser.

12. The system according to claim 1, wherein each segment has a first end and a second end and an arcuate shape defined by a curvature that is two-dimensional and constant between the first and second ends.

13. An assembly for mitigating slugging of multiphase hydrocarbons that is to be positioned between a subsea flowline extending substantially longitudinally along a sea floor and a riser extending from a surface of the sea toward the sea floor, the assembly comprising:
a plurality of consecutively joined tubular segments, each of the segments being arcuate along a predetermined arcuate angle, having a substantially uniform cross-section, wherein each tubular segment positioned between the tubular segments to be connected to the flowline and the riser, respectively, is oriented at a predetermined angle of rotation relative to adjacent tubular segments, the predetermined angle being between 0 and 90 degrees.

14. The assembly according to claim 13, wherein the angle of rotation is between 0 degrees and 45 degrees, thereby causing the flowpath of the hydrocarbons to be in a spiral through the slug-mitigation assembly.

15. The assembly according to claim 13, wherein the arcuate angle is selected from a group consisting of about 45 degrees and about 90 degrees.

16. The assembly according to claim 15, wherein the substantially uniform cross-section is substantially circular.

17. The assembly according to claim 13, wherein the slug-mitigating assembly further comprises:
an assembly centerline, from which the tubular segments deviate in differing directions along the length of the slug-mitigating assembly; and
an amplitude being defined as the maximum distance from the assembly centerline to a centerline of the flowpath; and wherein
the amplitude divided by the diameter of the substantially uniform cross-section defines a slug-mitigating assembly ratio that is greater than 0.5.

18. The system according to claim 17, wherein the tubular segments deviate from the assembly centerline in substantially opposite directions.

19. The system according to claim 17, wherein the tubular segments deviate from the assembly centerline substantially equally in the differing directions.

20. The system according to claim 19, wherein the tubular segments deviate from the assembly centerline substantially equally in all directions surrounding the assembly centerline.

21. An assembly according to claim 13, wherein each segment has a first end and a second end and an arcuate shape defined by a curvature that is two-dimensional and constant between the first and second ends.

22. A method for mitigating slugging in the conveyance of hydrocarbons from the sea floor to the surface of the sea, comprising:
a) conveying multiphase hydrocarbons from a flowline to a riser through a slug-mitigating region, the slug-mitigating region comprising a plurality of tubular segments, each of the plurality of tubular segments being oriented at a predetermined angle of rotation relative to the immediately prior tubular segment, thereby causing a flowpath of the hydrocarbons to be in a spiral though the slug-mitigation assembly;
(b) maintaining a volume within the slug-mitigating region for the conveyance of the multiphase hydrocarbons with a substantially uniform cross-section of the slug-mitigating region through which the hydrocarbons flow;
(c) altering a flowpath of the hydrocarbons along a plurality of arcs formed in the slug-mitigating region; and
(d) inducing the hydrocarbons to swirl when passing through the slug-mitigation assembly in response to the spiral shape.

23. A method according to claim 22, wherein each segment has a first end and a second end and an arcuate shape defined by a curvature that is two-dimensional and constant between the first and second ends.

24. A system for mitigating slugging in the conveyance of hydrocarbons in a flowline, comprising:
a first portion of flowline extending substantially longitudinally along a declining surface of the sea floor, the first portion of flowline carrying multiphase hydrocarbons therein;
a second portion of flowline extending upward from adjacent the first portion of flowline, the second portion of flowline being in fluid communication with the first portion of flowline; and
a slug-mitigating region positioned between the first and second portions of flowline so that the slug-mitigating region receives the hydrocarbons from the first portion of flowline and conveys the hydrocarbons to the second portion of flowline, the slug-mitigating region having a plurality of consecutively joined tubular segments that are each arcuate along a predetermined arcuate angle, each segment having a substantially uniform cross-section, wherein each tubular segment positioned between the tubular segments connected to the first and second portions of flowline, respectively, is oriented at a predetermined angle of rotation relative to adjacent tubular segments, and the angle of rotation being such that the flowpath of the hydrocarbons is in a spiral through the slug-mitigation region.

25. The system according to claim 24, wherein each of the tubular segments being positioned such that the hydrocarbons exiting the tubular segment are longitudinally closer to the second portion of flowline than the hydrocarbons entering the tubular segment.

26. The system according to claim 24, wherein the arcuate angle is about 45 degrees.

27. The system according to claim 24, wherein the arcuate angle is about 90 degrees.

28. The system according to claim 24, wherein the arcuate angle is about 90 degrees.

29. The system according to claim 24, wherein the substantially uniform cross-section is substantially circular.

30. The system according to claim 24, wherein the slug-mitigating region further comprises:
a region centerline, from which the tubular segments deviate in differing directions along the length of the slug-mitigating region; and
an amplitude being defined as the maximum distance from the region centerline to a centerline of the flowpath.

31. The system according to claim 30, wherein the amplitude divided by the diameter of the substantially uniform cross-section defines a slug-mitigating region ratio that is greater than 0.5.

32. The system according to claim 30, wherein the tubular segments deviate from the region centerline in substantially opposite directions.

33. The system according to claim 30, wherein the tubular segments deviate from the region centerline substantially equally in the differing directions.

34. The system according to claim 33, wherein the tubular segments deviate from the region centerline substantially equally in all directions surrounding the region centerline.

35. The system according to claim 24, wherein the slug-mitigating region extends substantially longitudinally with the declining surface prior to connection with the second portion of flowline.

36. A system according to claim 24, wherein each segment has a first end and a second end and an arcuate shape defined by a curvature that is two-dimensional and constant between the first and second ends.

* * * * *